(12) United States Patent
Ridder et al.

(10) Patent No.: US 11,225,141 B2
(45) Date of Patent: Jan. 18, 2022

(54) STANDING PEDAL FOR A VEHICLE

(71) Applicant: Hella GmbH & Co. KGaA, Lippstadt (DE)

(72) Inventors: Ralf Ridder, Lippstadt (DE); Claus Viethen, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/049,132

(22) PCT Filed: May 2, 2018

(86) PCT No.: PCT/EP2018/061178
§ 371 (c)(1),
(2) Date: Oct. 20, 2020

(87) PCT Pub. No.: WO2019/210945
PCT Pub. Date: Nov. 7, 2019

(65) Prior Publication Data
US 2021/0237569 A1    Aug. 5, 2021

(51) Int. Cl.
*B60K 26/02* (2006.01)
*G05G 1/44* (2008.04)
(Continued)

(52) U.S. Cl.
CPC ............ *B60K 26/02* (2013.01); *G05G 1/44* (2013.01); *G05G 5/05* (2013.01); *B60K 23/02* (2013.01); *B60T 7/04* (2013.01)

(58) Field of Classification Search
CPC ............ G05G 1/30; G05G 1/44; G05G 1/445; G05G 1/46; B60T 7/04; B60T 7/06; B60K 26/02; B60K 26/021
See application file for complete search history.

(56) References Cited

U.S. PATENT DOCUMENTS

2004/0149070 A1 *   8/2004   Solta ................. B60K 26/02
                                              74/513
2007/0151398 A1 *   7/2007   Kim .................. G05G 5/03
                                              74/513
(Continued)

FOREIGN PATENT DOCUMENTS

DE          10121317 A1     11/2002
DE     102008003296 A1 *     7/2009  ............ B60K 26/02
(Continued)

OTHER PUBLICATIONS

Machine Translation of DE 10 2009 032 664, obtained Jun. 17, 2021.*
(Continued)

*Primary Examiner* — Richard W Ridley
*Assistant Examiner* — Brian J McGovern
(74) *Attorney, Agent, or Firm* — Husch Blackwell LLP

(57) ABSTRACT

A standing pedal is provided for a vehicle, comprising a support, a pedal arm, a rocker, a return spring for forcing the pedal arm into a direction of an idle position of the pedal arm, and a power transmission element. The return spring is linked to the support and the rocker in a power transmitting manner. The power transmission element is linked to the pedal arm and the rocker in a power transmitting manner. In order to provide a standing pedal for a vehicle, which is robust and shows an enhanced durability, the pivot axis of the pedal arm and the power transmission element are located on a common first side of the rocker with respect to a basic part of the rocker.

7 Claims, 4 Drawing Sheets

(51) Int. Cl.
*G05G 5/05* (2006.01)
*B60K 23/02* (2006.01)
*B60T 7/04* (2006.01)

(56) References Cited

U.S. PATENT DOCUMENTS

| | | | | |
|---|---|---|---|---|
| 2007/0157755 | A1* | 7/2007 | Kim | G05G 1/483 74/513 |
| 2011/0197700 | A1* | 8/2011 | O'Neill | G05G 5/03 74/512 |
| 2015/0277479 | A1* | 10/2015 | Viethen | B60K 26/021 74/560 |
| 2018/0253120 | A1* | 9/2018 | Kim | G05G 5/05 |
| 2020/0183443 | A1* | 6/2020 | Kim | B60T 7/042 |

FOREIGN PATENT DOCUMENTS

| | | | | |
|---|---|---|---|---|
| DE | 102008018140 | A1 | | 10/2009 |
| DE | 102009032664 | A1 * | 1/2011 | ............... G05G 1/38 |
| DE | 102011054655 | A1 | | 4/2013 |
| DE | 102012112514 | A1 | | 6/2014 |
| DE | 102014006438 | A1 | | 11/2015 |
| DE | 102014213852 | A1 * | 1/2016 | ............. B60K 26/02 |
| DE | 102015106479 | A1 | | 10/2016 |
| DE | 102016201332 | A1 | | 8/2017 |

OTHER PUBLICATIONS

Machine Translation of DE 10 2008 003 296, obtained Jun. 17, 2021.*
Machine Translation of DE 10 2014 213 852, obtained Sep. 23, 2021.*

* cited by examiner

STANDING PEDAL FOR A VEHICLE

CROSS REFERENCE

This application claims priority to PCT Application No. PCT/EP2018/061178, filed May 2, 2018, the entirety of which is hereby incorporated by reference.

FIELD OF THE INVENTION

The present invention relates to a standing pedal for a vehicle.

BACKGROUND

Standing pedals for vehicles are already known in different embodiments.

From the DE 10 2008 018 140 A1 a standing pedal for a vehicle is known, comprising a support, a pedal arm mounted to said support and pivotable around a pivot axis of said pedal arm between an idle position and a maximum deflection position of said pedal arm, a rocker mounted to said support and pivotable around a pivot axis of said rocker, whereat said rocker comprises a basic part pivotably mounted to said support and a first rocker arm, further comprising a return spring for forcing said pedal arm into a direction of said idle position of said pedal arm and a power transmission element, whereat said return spring is linked to said support and said first rocker arm in a power transmitting manner and said power transmission element is linked to said pedal arm and said first rocker arm in a power transmitting manner, whereat said pivot axis of said pedal arm and said pivot axis of said rocker are in parallel to each other and whereat said pivot axis of said pedal arm runs perpendicular to a plane defined by a power transmission axis of said return spring and a power transmission axis of said power transmission element.

SUMMARY OF THE INVENTION

It is an object of the invention to provide a standing pedal for a vehicle, which is robust and shows an enhanced durability.

This object of the invention is solved by a standing pedal for a vehicle, wherein the pivot axis of the pedal arm and the power transmission element are located on a common first side of the rocker with respect to the basic part of the rocker.

A main advantage of the standing pedal for a vehicle according to the invention is, that the inventive standing pedal is robust and shows an enhanced durability, thus the standing pedal according to the invention is working with proper function for a prolonged timespan. With respect to standing pedals of vehicles a major problem is, that there is always a risk of getting debris like small stones into the mechanism of the standing pedal. The standing pedal according to the invention solves this problem by employing an easy design, too. Thus, the invention can be realized with a minimum of alterations in the design of a standing pedal.

Further advantageous developments of the inventive standing pedal for a vehicle are apparent from the sub-claims as well as from the following description of exemplary embodiments of the standing pedal for a vehicle according to the invention by means of the attached Figures.

Basically, the design of the standing pedal according to the invention can be of any suitable shape, material, dimension and positioning. This is also true for the kind, shape, material, dimension, number and positioning of the return spring of the inventive standing pedal. Advantageously, the return spring is also located on said first side of said rocker, like said pivot axis of said pedal arm and said power transmission element are. That way, the design of the standing pedal according to the invention is simplified, because the return spring can be linked to said rocker by said first rocker arm, too.

An alternative to the aforementioned embodiment of the inventive standing pedal for a vehicle is, that said rocker comprises a second rocker arm, whereat said first rocker arm and said second rocker arm are located on opposite sides of said basic part of said rocker and said return spring is linked to said second rocker arm. This can be advantageous for certain embodiments of the inventive standing pedal for a vehicle; for example, embodiments with another geometry and shape.

A particular preferable development of the inventive standing pedal for a vehicle is, that said return spring is linked to said support and/or said rocker by a pivot axis of said return spring parallel to said pivot axis of said pedal arm. Hereby, the return spring will not being bent while said pedal arm is pressed with an actuating force and therefore the power transmission axis of said return spring is kept straight and well defined.

A further advantageous development of the standing pedal according to the invention is, that at least one pair of contact surfaces of said rocker and said support are designed, configured and located to each other to provide a hysteresis, while said pedal arm is moved relative to said support. Hereby, the design of the standing pedal according to the invention is further simplified. Further parts for generating hysteresis are not necessary. Thus, less parts and less space are needed for realizing the inventive standing pedal for a vehicle having a hysteresis. Contact surfaces of said rocker and said support can be built in a direct or in an indirect manner. For example, it is possible to link a bearing shell or something similar to said rocker and/or said support in order to realize said contact surface of said rocker and/or said support and to enhance the function and the durability of said contact surfaces.

Another advantageous development of the standing pedal according to the invention is, that said support comprises a first part and a second part, whereat said second part is pivotably mounted to said first part and said basic part of said rocker is guided between said first part and said second part. That way, the degree of freedom in the design of the inventive standing pedal for a vehicle is enhanced.

Basically, with respect to the aforementioned embodiment of the invention, the return spring and/or the power transmission element can be linked to the first part of said support in a power transmitting manner. Advantageously, said return spring and said power transmission element are linked to said second part of said support in a power transmitting manner. Hereby, the force of the return spring as well of the power transmission element is induced into the second part of said support. Thus, friction between contact surfaces of said rocker and said support, namely said first part and said second part of said support, can be enlarged without using further parts or a different design. For example, it would be easy to enhance the hysteresis of the inventive standing pedal for a vehicle and a force/deflection graph of the inventive pedal can be modified. The force/deflection graph is displaying the relationship between the actuating force the pedal arm is pressed with and the deflection of the pedal arm, thus the position of the pedal arm relative to the support.

In general, said power transmission element can be of any kind, shape, material, dimension and position relative to the pedal arm and the rocker. Advantageously, said power transmission element is designed and configured as a rigid coupling rod which is linked to said pedal arm and said rocker by pivot axes of said power transmission element parallel to said pivot axis of said pedal arm. That way, the power transmission element is able to transmit high loads and its power transmission axis is well defined.

An alternative to the aforementioned embodiment of the inventive standing pedal for a vehicle is, that said power transmission element is designed and configured as a rigid cam of said pedal arm which is guided on a crank of said rocker in a power transmitting manner or as a rigid cam of said rocker which is guided on a crank of said pedal arm in a power transmitting manner. Hereby, the design of the power transmission element is simpler. Furthermore, the power transmitting link between the pedal arm and the rocker has one more degree of freedom. For example, by the design of said crank the force/deflection graph of the inventive pedal can be modified, too. Said crank can be of any shape; e.g. having a profiled contour on which said rigid cam is guided.

A particular preferable development of the standing pedal for a vehicle according to the invention is, said power transmission element and an opening of said support corresponding to said power transmission element are designed, configured and located to each other to provide a nearly closed support in each position of said pedal arm. That way, it is possible to further enhance the durability of the inventive standing pedal for a vehicle.

A particular advantageous development of the standing pedal for a vehicle according to the aforementioned embodiment is, that said power transmission element and/or said support are/is designed and configured to provide, that debris are moved away from said opening of said support. Hereby, the durability of the inventive standing pedal for a vehicle is further improved. For example, it is possible to build the power transmission element and/or the support with a certain shape in order to force debris to move on and not to settle in the vicinity of the opening of the support. Another example is, that a deflector is arranged to or formed out of the power transmission element and/or the support in order to deflect debris away from the opening of the support.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
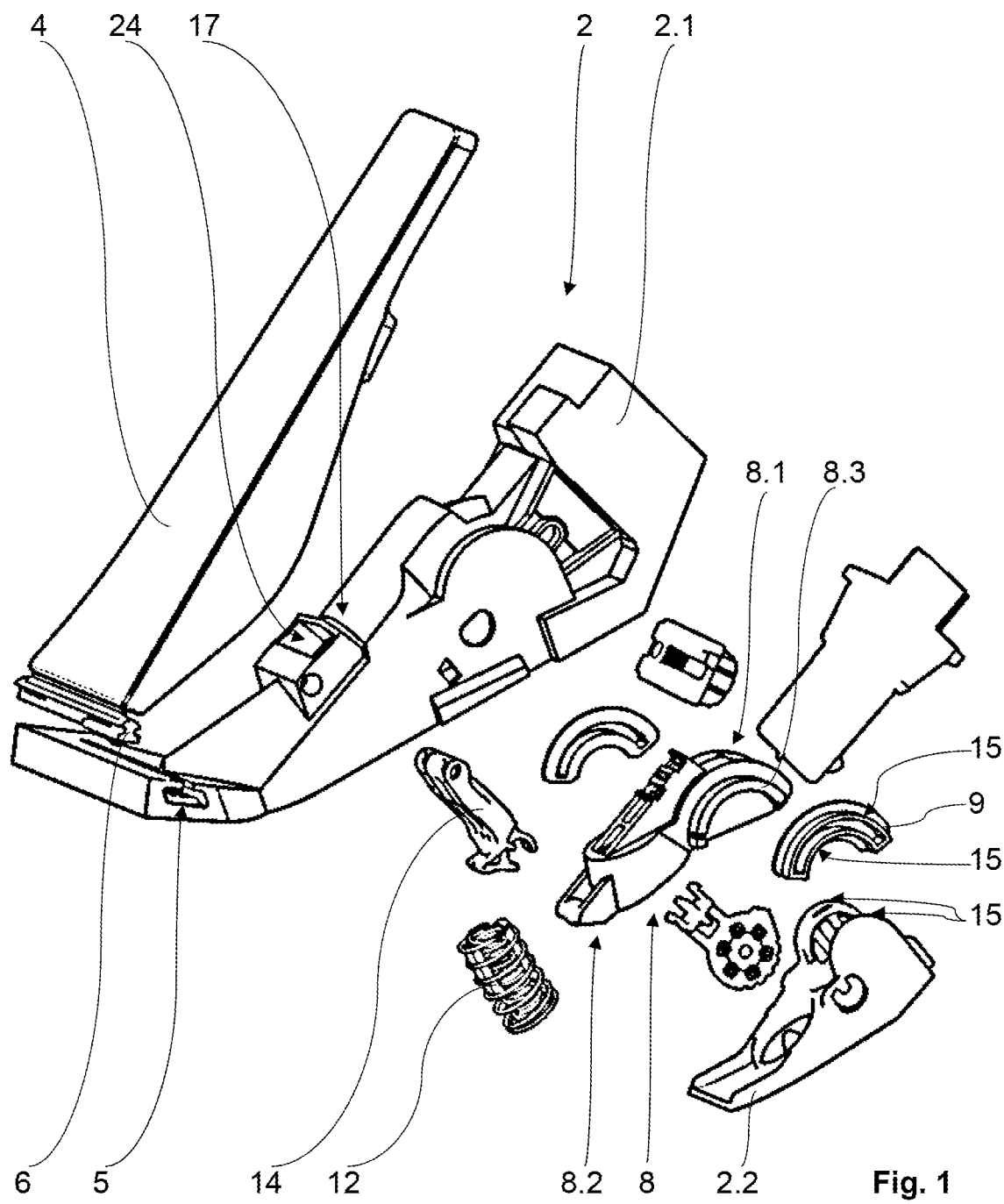
FIG. 1 is a first embodiment of a standing pedal for a vehicle according to the invention in an exploded view.
Figure 2:
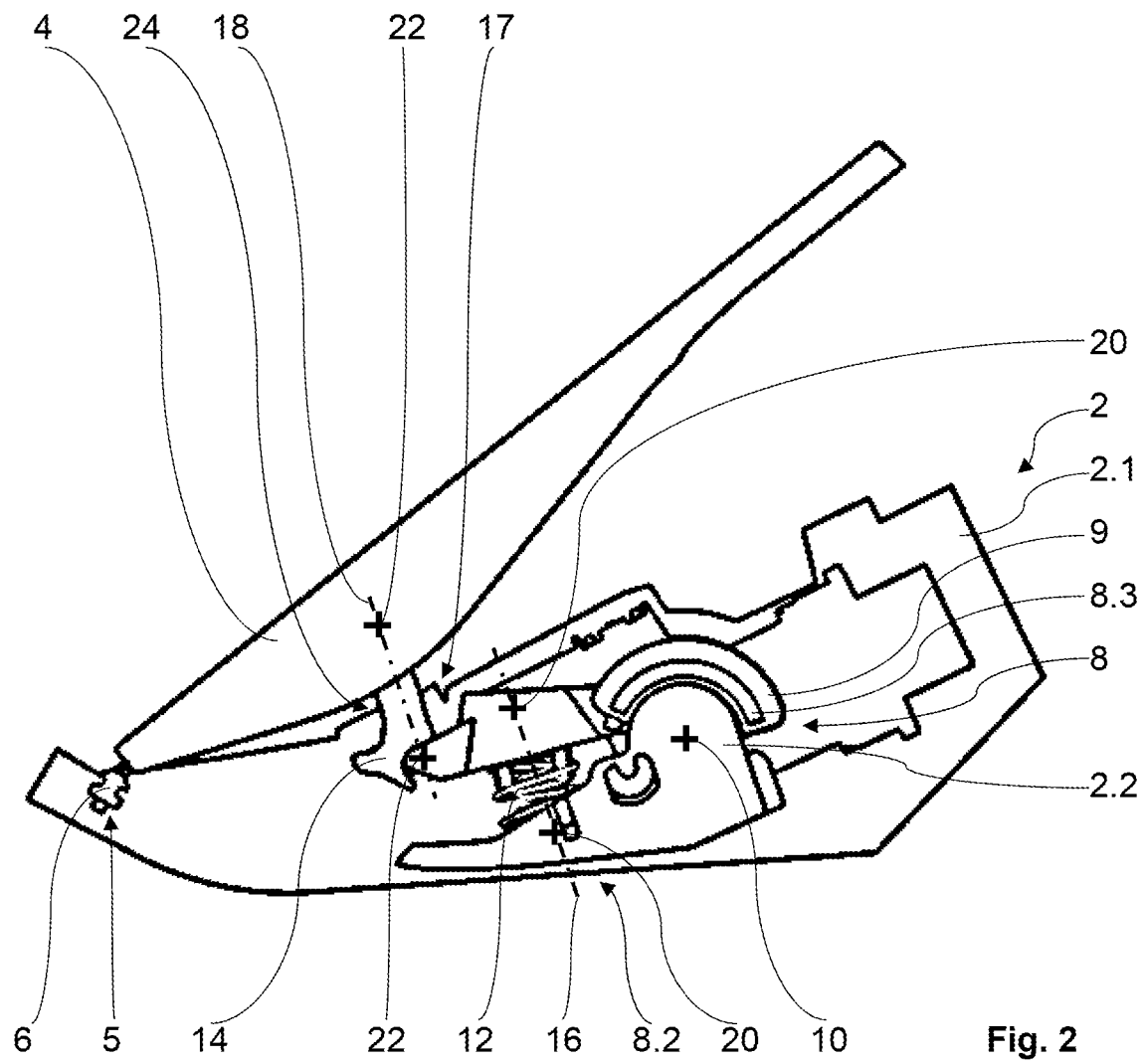
FIG. 2 illustrates said first embodiment according to FIG. 1 in an assembly drawing, in a sectional side view, with the pedal arm in an idle position.

FIG. 1 displays a first embodiment of a standing pedal according to the invention designed as an acceleration pedal, comprising a support 2, a pedal arm 4 mounted to said support 2 and pivotable around a pivot axis 6 of said pedal arm 4 between an idle position and a maximum deflection position of said pedal arm 4. Said pivot axis 6 of said pedal arm 4 is built as an integral hinge of said pedal arm 4 which is inserted in a channel 5 of said support 2. In FIG. 1 said integral hinge 6 of said pedal arm 4 is not inserted in said channel 5 of said support 2, but said pedal arm 4 is displayed in an orientation comparable to said orientation of said pedal arm 4 which said integral hinge 6 inserted in said channel 5. In FIGS. 1 and 2 said pedal arm 4 is displayed in said idle position of said pedal arm 4. Said maximum deflection position of said pedal arm 4 is not displayed. Said support 2 comprises a first part 2.1 and a second part 2.2, whereat said second part 2.2 is pivotably mounted to said first part 2.1.

The idle position and the maximum deflection position of the different embodiments of the invention are more or less identical to each other.

Said first embodiment further comprises a rocker 8 mounted to said support 2 and pivotable around a virtual pivot axis 10 of said rocker 8, whereat said rocker 8 comprises a basic part 8.1 pivotably mounted to said support 2 and a first rocker arm 8.2, which is located on a first side of said basic part 8.1, as well as a return spring 12 for forcing said pedal arm 4 into a direction of said idle position of said pedal arm 4 and a power transmission element 14, whereat said return spring 12 is built as a double helical spring 12 linked to said second part 2.2 of said support 2 and said first rocker arm 8.2 in a power transmitting manner and said power transmission element 14 is linked to said pedal arm 4 and said first rocker arm 8.2 in a power transmitting manner, too. Said virtual pivot axis 10 of said rocker 8 is symbolized by a cross 10 in FIG. 2.

Said basic part 8.1 of said rocker 8 comprises two curved shoulders 8.3 on opposite sides of said basic part 8.1, whereat one separate bearing shell 9 is attached to each of said shoulders 8.3. In FIGS. 1 and 2 only one of said shoulders 8.3 of said basic part 8.1 of said rocker 8 is visible. Said rocker 8 is placed with said basic part 8.1, namely said shoulders 8.3 and said bearing shells 9 attached to said shoulders 8.3, between said first part 2.1 and said second part 2.2 of said support 2. For that purpose, each of said first part 2.1 and said second part 2.2 comprises a curved surface corresponding to curved surfaces of said bearing shells 9 attached to said shoulders 8.3 of said rocker 8. Thus, said rocker 8 with said basic part 8.1 is guided between said first part 2.1 and said second part 2.2 of said support 2. Said curved surfaces of said bearing shells 9 attached to said rocker 8 and said first part 2.1 and said second part 2.2 are built as contact surfaces 15 of said rocker 8 and said support 2 in order to provide a hysteresis, while said pedal arm 4 is moved relative to said support 2.

Said pivot axis 6 of said pedal arm 4 and said virtual pivot axis 10 of said rocker 8 are in parallel to each other and said pivot axis 6 of said pedal arm 4 runs perpendicular to a plane defined by a power transmission axis of said return spring 12 and a power transmission axis of said power transmission element 14, wherein said pivot axis 6 of said pedal arm 4, said return spring 12 and said power transmission element 14 are located on said first side of said rocker 8 with respect to said basic part 8.1 of said rocker 8. Said power transmission axis of said return spring 12 is symbolized by a broken line 16 and said power transmission axis of said power transmission element 14 is symbolized by a broken line 18 in FIG. 2.

In said first embodiment, said return spring 12 is linked to said support 2, namely said second part 2.2 of said support 2, and said first rocker arm 8.2 of said rocker 8 by pivot axes 20 of said return spring 12 parallel to said pivot axis 6 of said pedal arm 4. Thus, said power transmission axis 16 of said return spring 12 is kept straight because of said pivot axes 20 of said return spring 12. Said pivot axes 20 are symbolized by crosses 20 in FIG. 2.

Said power transmission element 14 is designed and configured as a rigid coupling rod 14 which is linked to said pedal arm 4 and said first rocker arm 8.2 of said rocker 8 by pivot axes 22 of said power transmission element 14 parallel to said pivot axis 6 of said pedal arm 4. Said pivot axes 22 are symbolized by crosses 22 in FIG. 2.

Said support 2, namely said first part 2.1 of said support 2, comprises an opening 24 for said power transmission element 14, namely said rigid coupling rod 14. Said power transmission element 14 and said opening 24 of said support 2 are designed, configured and located to each other to provide a nearly closed support 2 in each position of said pedal arm 4. Thus, said rigid coupling rod 14 inserted in said opening 24 substantially closes said opening 24 in every position of said pedal arm 4. Hereby, debris are prevented from intruding into the mechanism of the standing pedal according to the first embodiment of the invention. Furthermore, said power transmission element 14 and said support 2 are designed and configured to provide, that debris are moved away from said opening 24 of said support 2. For that purpose, outer contours of said rigid coupling rod 14 and said first part 2.1 of said support 2 are rounded in order to prevent debris from getting into the vicinity of said opening 24. Moreover, a deflector 17 is formed out of said first part 2.1 of said support 2 to guide debris away from said opening 24, too.

In the following, the function of said first embodiment of a standing pedal for a vehicle according to the invention is explained by means of FIGS. 1 and 2.

A user of said accelerator pedal, namely a driver of said vehicle comprising said accelerator pedal, presses down said pedal arm 4 of said accelerator pedal with a foot, thus loading said pedal arm 4 with an actuating force in order to transfer said pedal arm 4 from said idle position of said pedal arm 4 displayed in FIGS. 1 and 2 to said maximum deflection position of said pedal arm 4 not displayed. Said maximum deflection position of said pedal arm 4 would be reached by pressing said pedal arm 4 down, until said pedal arm 4 could not be moved any further. Said pedal arm 4 would turn in a clockwise manner around said pivot axis 6 of said pedal arm 4 while said pedal arm 4 is pressed down, thus transferred from said idle position of said pedal arm 4 displayed in FIG. 2 to said maximum deflection position of said pedal arm 4 not displayed. While transferring said pedal arm 4 to said maximum deflection position of said pedal arm 4, said pedal arm 4 moves said basic part 8.1 of said rocker 8 in a counterclockwise manner around said pivot axis 10 of said rocker 8 via pressing down said rigid coupling rod 14 and said first rocker arm 8.2 of said rocker 8. Because of that movement of said basic part 8.1 of said rocker 8 relative to said support 2, namely said bearing shells 9 of said shoulders 8.3 of said basic part 8.1 to said first and second part 2.1, 2.2 of said support 2, said contact surfaces 15 of said bearing shells 9 and said first and second part 2.1, 2.2 are generating friction and thus generating hysteresis.

During release of said pedal arm 4, namely while not pressing said pedal arm 4, said pedal arm 4 would be moved from said return spring 12 back to said idle position of said pedal arm 4 displayed in FIG. 1. For that purpose, said return spring 12 presses said first rocker arm 8.2 of said rocker 8 via said second part 2.2 of said support 2 upwards, thus away from said second part 2.2. This movement of said first rocker arm 8.2 causes said basic part 8.1 of said rocker 8 to turn in a clockwise manner around said pivot axis 10 of said rocker 8. Because of that movement of said basic part 8.1 of said rocker 8 relative to said support 2, namely said bearing shells 9 of said shoulders 8.3 of said basic part 8.1 to said first and second part 2.1, 2.2 of said support 2, said contact surfaces 15 of said bearing shells 9 and said first and second part 2.1, 2.2 are generating friction and thus generating hysteresis, too. Said pedal arm 4 is lifted via said rigid coupling rod 14 into said idle position as displayed in FIGS. 1 and 2.

Figure 3:
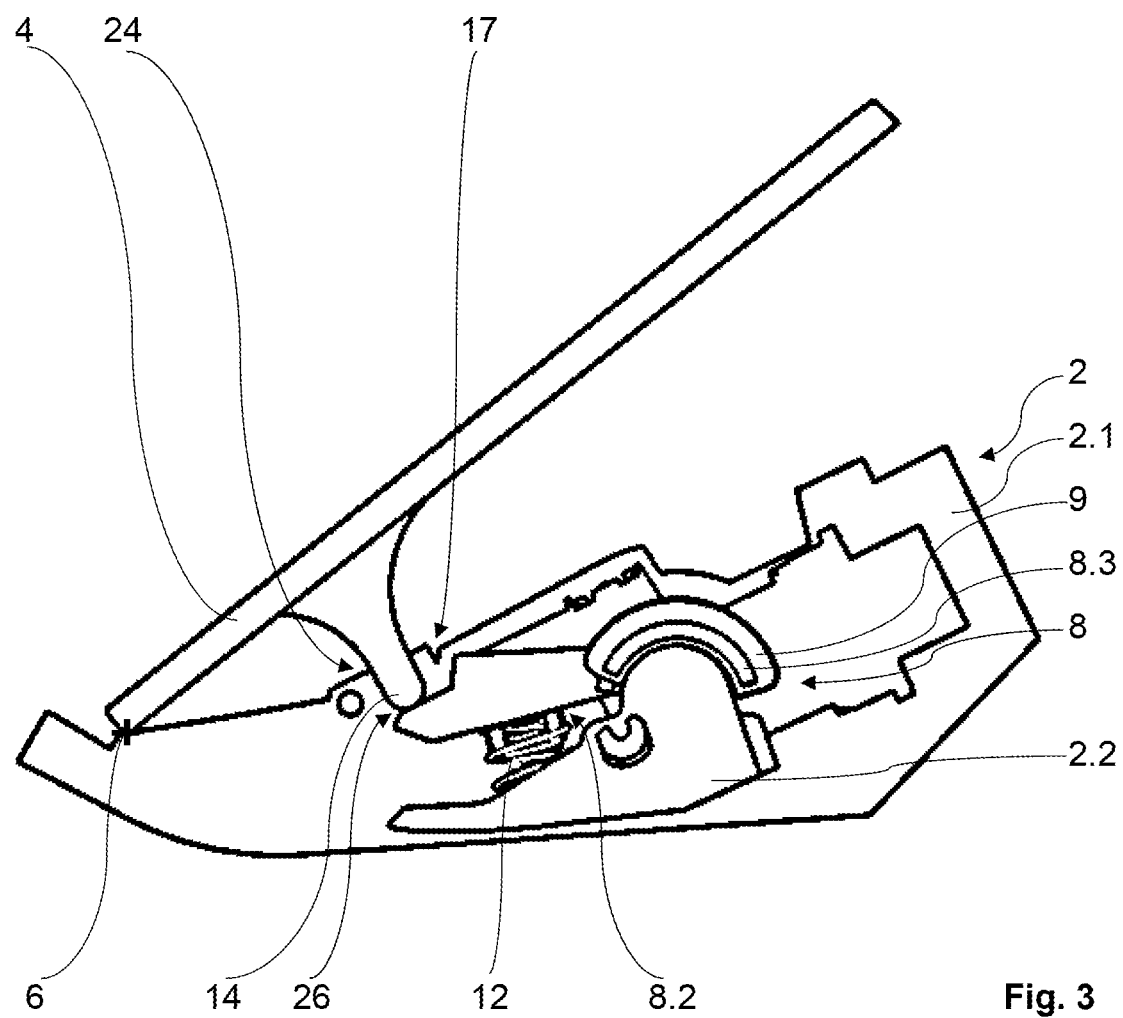
FIG. 3 is a second embodiment of a standing pedal for a vehicle according to the invention in a sectional side view similar to FIG. 2.

In FIG. 3 a second embodiment is shown in a view similar to FIG. 2 of the first embodiment already discussed.

In contrast to the first embodiment as displayed in FIGS. 1 and 2, the second embodiment does not comprise a rigid coupling rod for linking said pedal arm 4 to said first rocker arm 8.1 of said rocker 8. Instead of that, said power transmission element 14 is designed and configured as a rigid cam 14 of said pedal arm 4 which is guided on a crank 26 of said rocker 8, namely of said first rocker arm 8.2 of said rocker 8, in a power transmitting manner. Thus, said rigid cam 14 of said pedal arm 4 moves along said crank 26 of said rocker 8 while said pedal arm 4 is transferred from said idle position of said pedal arm 4 as displayed in FIG. 3 to said maximum deflection position of said pedal arm 4 not displayed. Besides this aspect, said standing pedal for a vehicle according to the second embodiment is designed substantially equal to said first embodiment discussed above. For the rest of the design and function of the inventive standing pedal for a vehicle according to the second embodiment, it can be referred to the explanations according to the first embodiment, which are included in total for the explanation of the second embodiment.

Figure 4:
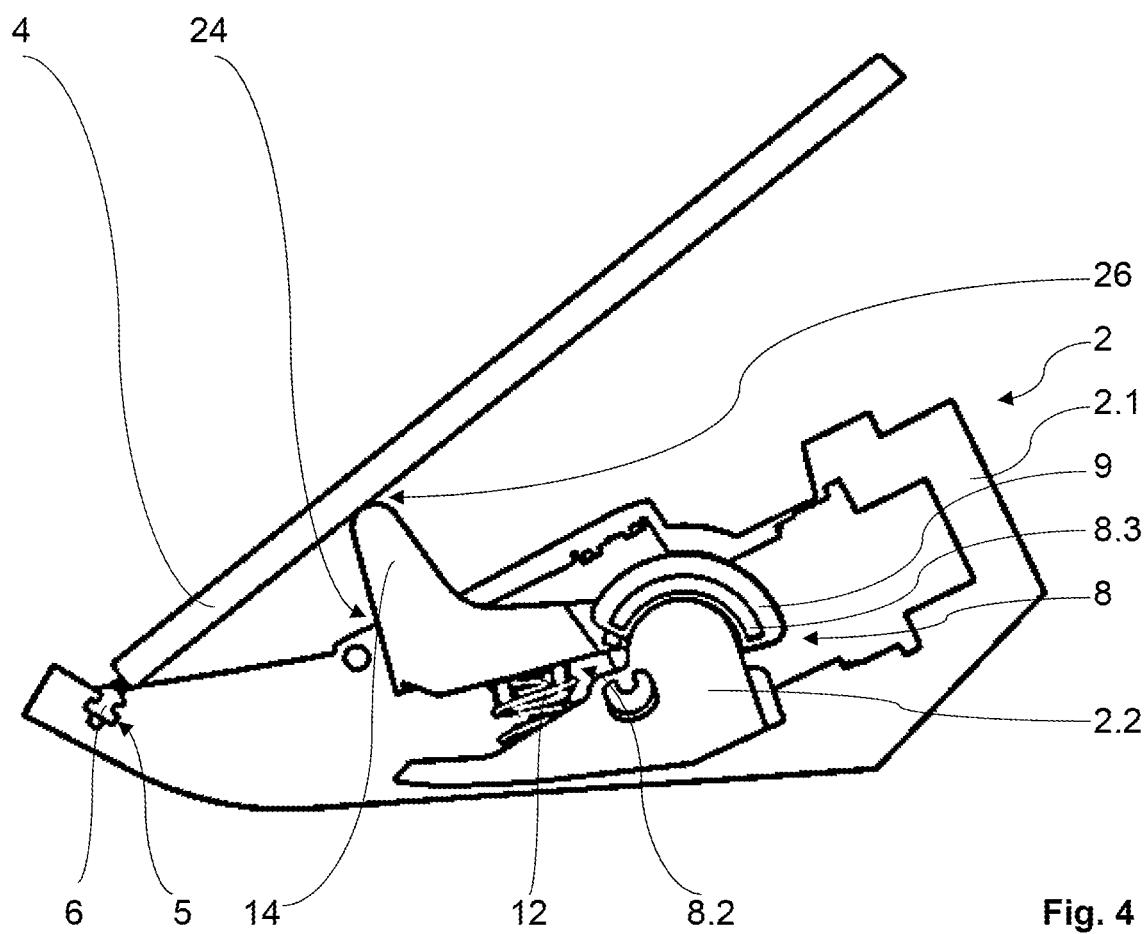
FIG. 4 is a third embodiment of a standing pedal for a vehicle according to the invention in a sectional side view similar to FIG. 2.

FIG. 4 displays a third embodiment in a view similar to FIGS. 2 and 3 of the first and second embodiment already discussed.

The third embodiment is quite similar to the second embodiment. Instead of said pedal arm with said rigid cam and said first rocker arm with said crank for guidance of said rigid cam, in the third embodiment, the power transmission element 14 is designed and configured as a rigid cam 14 of the rocker 8, namely the first rocker arm 8.2 of said rocker 8, which is guided on a crank 26 of the pedal arm 4 in a power transmitting manner. Thus, the positioning of said rigid cam 14 and said crank 26 are just inverted in comparison to the second embodiment explained above. Because of the fact, that the third embodiment is substantially equal to said second embodiment, the explanations to the second embodiment as well as to the first embodiment can be referred to. The explanations of the first and second embodiment are included in total for the explanation of the third embodiment.

The invention is not limited to the exemplary embodiments discussed before.

Of course, the invention is not limited to acceleration pedals, but can be used in an advantage manner for other pedals for a vehicle, like clutch pedals or brake pedals.

Furthermore, said power transmission element is not limited to a rigid coupling rod or a rigid cam, but can be of any power transmitting kind. For example, not only rigid power transmission elements are possible. Said power transmission element cold be designed and configured as a coupling spring, too. Of course, said power transmission element can be realized as a combined element, too. E.g. it would be possible to merge a rigid cam or rigid coupling rod with a coupling spring in a combined element.

If said power transmission element is comprising a coupling spring, the pedal equipped with such a power transmission element could also comprise at least one stop element in order to limit a pivot angle of said rocker while said pedal arm is pivoted around said pivot axis of said pedal arm in direction of said idle position of said pedal arm.

Moreover, said rocker could comprise a second rocker arm, whereat said first rocker arm and said second rocker arm are located on opposite sides of said basic part of said rocker and said return spring is linked to said second rocker arm.

The pedal for a vehicle according to the invention is highly flexible and thus can be used in and advantageous way satisfying a lot of different requirements and specifications for a pedal.

LIST OF REFERENCE NUMBERS

2 Support
2.1 First part of support 2
2.2 Second part of support 2
4 Pedal arm
5 Channel for insertion of pivot axis 6, built as an integral hinge
6 Pivot axis of pedal arm 4
8 Rocker
8.1 Basic part of rocker 8
8.2 First rocker arm of rocker 8
8.3 Shoulders of rocker 8
9 Bearing shells
10 Virtual pivot axis of rocker 8
12 Return spring
14 Power transmission element
15 Contact surface
16 Power transmission axis of return spring 12
17 Deflector of support 2
18 Power transmission axis of power transmission element 14
20 Pivot axes of return spring 12
22 Pivot axes of power transmission element 14
24 Opening of support 2
26 Crank for guiding of rigid cam as power transmission element 14

The invention claimed is:

1. A standing pedal for a vehicle, the standing pedal comprising:
   a support including a first part and a second part pivotably mounted to said first part,
   a pedal arm mounted to said support and pivotable around a pivot axis of said pedal arm between an idle position and a maximum deflection position of said pedal arm,
   a rocker mounted to said support and pivotable around a pivot axis of said rocker, said rocker including a basic part pivotably mounted to said support and a first rocker arm,
   a return spring for forcing said pedal arm into a direction of said idle position of said pedal arm and a power transmission element,
   wherein said return spring extends from the second part of said support to said rocker in a power transmitting manner,
   wherein said power transmission element extends from said pedal arm to said rocker in a power transmitting manner,
   wherein said pivot axis of said pedal arm and said pivot axis of said rocker are in parallel to each other and wherein said pivot axis of said pedal arm runs perpendicular to a plane defined by a power transmission axis of said return spring and a power transmission axis of said power transmission element, and
   wherein said pivot axis of said pedal arm and said power transmission element are located on a common first side of said rocker, with respect to said basic part of said rocker
   wherein said return spring is also located on said common first side of said rocker, and
   wherein the rocker includes at least one curved contact surface extending from a side thereof along a direction parallel to the pivot axis of the rocker, the at least one curved contact surface configured to engage a respective contact surface of each of the first and second parts of the support.

2. The standing pedal according to claim 1, wherein the at least one curved contact surface and the respective contact surfaces are designed, configured and located to each other to provide a hysteresis, while said pedal arm is moved relative to said support.

3. The standing pedal according to claim 1, wherein said return spring and said power transmission element are linked to said second part of said support in a power transmitting manner.

4. The standing pedal according to claim 1, wherein said power transmission element is a rigid coupling rod which is linked to said pedal arm and said rocker by pivot axes of said power transmission element parallel to said pivot axis of said pedal arm.

5. The standing pedal according to claim 1, wherein said power transmission element is a rigid cam of said pedal arm which is guided on a crank of said rocker, or is a rigid cam of said rocker which is guided on a crank of said pedal arm in a power transmitting manner.

6. The standing pedal according to claim 1, wherein said power transmission element and an opening of said support corresponding to said power transmission element are designed, configured and located to each other to provide a closed support in each position of said pedal arm.

7. The standing pedal according to claim 6, wherein at least one of said power transmission element and said support is designed and configured such that debris are moved away from said opening of said support.

* * * * *